3,019,872
FRICTION CLUTCH
Harry C. Morris, 1023 W. 8th St., Erie, Pa., and Robert F. Meier, Erie, Pa.; said Meier assignor to said Morris
Filed May 2, 1955, Ser. No. 505,126
5 Claims. (Cl. 192—44)

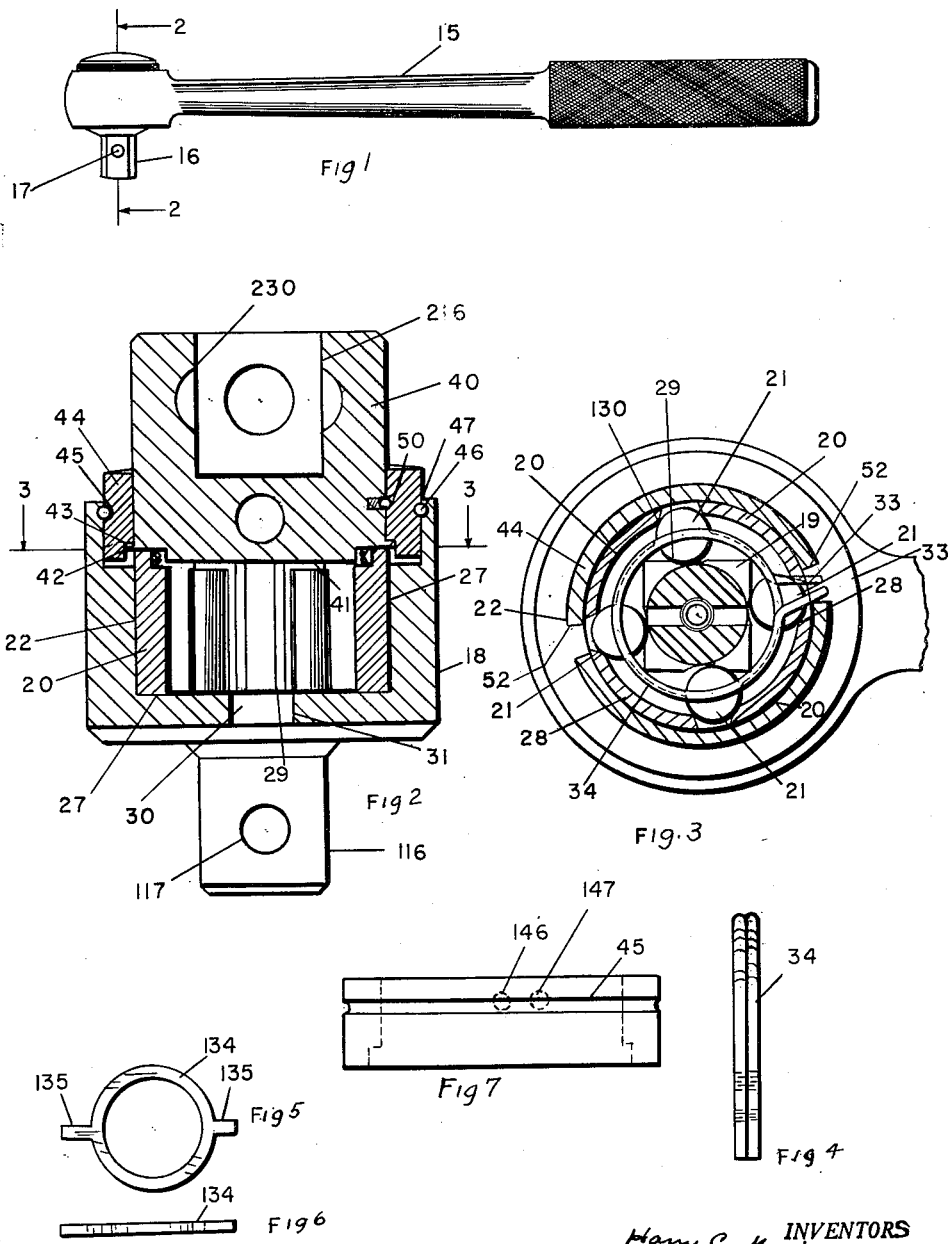

This invention relates to improvements in friction clutches operatively interposed between relatively movable parts where it is desired to obtain operable engagement in one direction at a time.

This application is a continuation in part of application Serial No. 212,997 filed February 27, 1951 which issued as Patent No. 2,707,540 on May 3, 1955, and constitutes an improvement thereover.

In the said application, a friction clutch is disclosed which has high torque transmitting characteristics and, in addition, is disclosed a means for proportioning various parts whereby they will not slip until failure of the parts occurs regardless of the forces applied thereto since due to the design of the parts of frictional forces resisting slipping increase with the applied forces and are always greater than the forces urging the parts to slip.

This application discloses a combination of mechanical principles arranged in a manner that definitely exerts a force outwardly at such an angle that the tangential component does not exceed the force of friction. Vector graph analysis shows that within a given angle off the center line of cams, that the resultant forces from the 90° opposed cams, through the rollers to the angle on the oversize wedges or shoes, virtually locks the movable parts. For it is recognized that the closer to the center line the cams on the driver that the initial force is applied, the greater the outward pressure will be. The angles are designed however so that the roller is free to instantly release when torque is reversed or the driven member is accelerated independent of the driver.

It is, accordingly, an object of this invention to provide a clutch which is simple in construction, economical to manufacture, and simple and efficient to use.

Another object of the invention is to provide a clutch which has functional parts thereof proportional according to a mathematical formula wherein the parts of the clutch are of such proportion that they will not slip relative to each other in an applied direction until failure of some part thereof occurs.

With the above and other objects in view, the present invention consists of the combination and arrangement of parts hereinafter more fully described, illustrated in the accompanying drawings, and more particularly pointed out in the appended claims, it being understood that changes may be made in the form, size, proportions, and minor details of construction without departing from the spirit or sacrificing any of the advantages of the invention.

In the drawings:

FIG. 1 is a side elevational view of a wrench embodying the present invention;

FIG. 2 is an enlarged vertical cross sectional view of an embodiment of the invention similar to that shown in FIG. 1 taken on a line corresponding to line 2—2 of FIG. 1;

FIG. 3 is a cross sectional view taken on line 3—3 of FIG. 2;

FIG. 4 is a side view of the reversing mechanism of the invention;

FIG. 5 is a top view of another embodiment of the reversing mechanism;

FIG. 6 is a side view of the mechanism shown in FIG. 5;

FIG. 7 is a side view of a part of the device shown in FIG. 2; and

Figure 8:
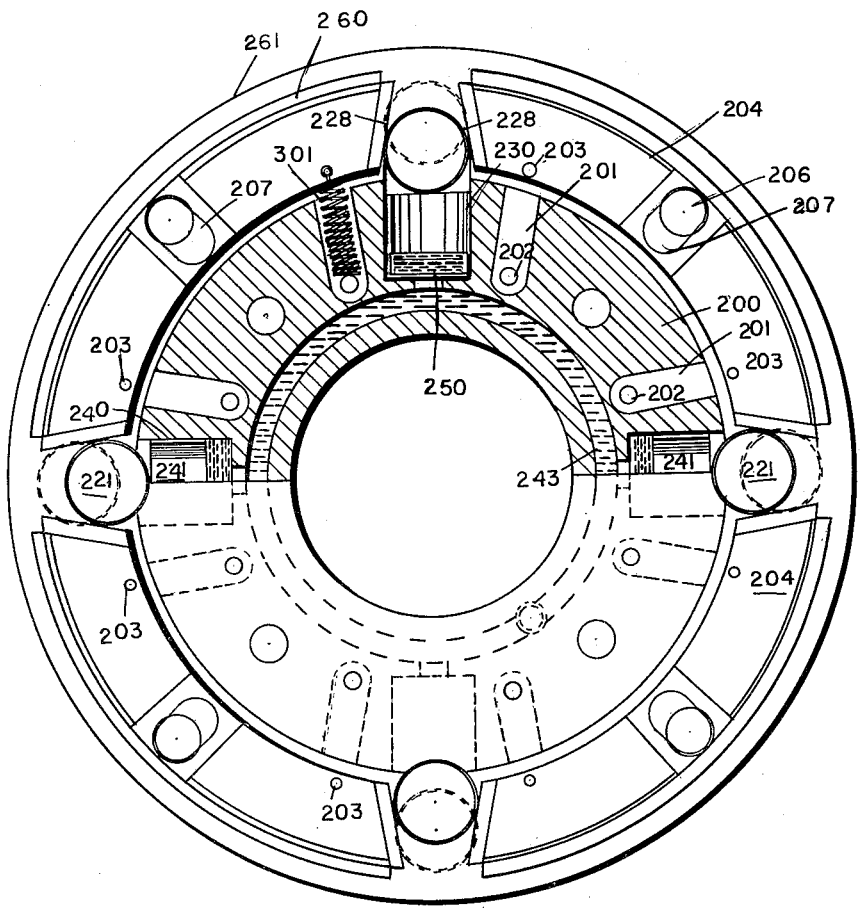
FIG. 8 is a cross sectional view of another embodiment of the invention similar to the view of the embodiment shown in FIG. 3.

In FIGS. 1 to 4 a wrench is disclosed having a handle 15 and the driven part to be turned, stem 16. This stem 16 is shown as being substantially square in cross section and on one side provided with a spring loaded ball detent 17 of conventional form. This stem 16 is adapted to be inserted in an opening of generally similar cross-sectional form provided in a conventional snap-on socket (not shown); the opening in the socket being a counterpart of stem 16. The detent 17 co-operates with said socket to retain the same on the stem in the usual manner. If desired, the stem 16 can be formed integrally with the wrench socket.

The embodiment of the invention shown in FIG. 2 has parts similar to the parts shown in FIG. 1 except the member 40 is substituted for the member 16. The friction clutch operatively interposed between the handle 15 and the stem 16 comprises an outer member 18 and inner member 19, a plurality of shoe members 20 and a plurality of circular wedge members in the form of rollers 21. Four shoe members 20 and four cam roller members 21 are shown. Outer member 18 could be formed integrally with the handle 15 of FIG. 1 or it could be attached by means of stem 116 to another wrench. The outer member 18 is provided with a first cylindrical counterbore having inner surface 22 which surrounds the inner member 19. Inner member 19 is shown as being formed integrally with the member 40 and as a vertical stem receiving bore 230. The inner member 19 is mounted on the outer member 18 for rotation about the vertical central axis of the surface. Stem 116 is formed integral with the body portion 18. The outer member 18 has a second counterbore 42 and in the second counterbore receives the collar 44 in the second counterbore 42. The collar 44 has a groove 45 therein which registers with the groove 46 in the outer member. When the collar is in place in the counterbore 42 with the groove 46 registering with groove 45 the two grooves receive the spring washer 47 to hold the collar 44 in place in the body 18 holding the member 40 in place. The rollers 21 and the shoes 20 have their lower surfaces engaging the lower surfaces of the counterbore 27. Inner member 19 has a concentrically axially disposed reduced size portion 30 that is received in a hole 31 in the outside member 18 concentric with the axial counterbore 27.

Each shoe member 20 is arcuately shaped having an outer cylindrical surface of greater radius of curvature than inside surface 27 which engages outer cylindrical surface 22 on the shoes 20. The end faces 28 of the adjacent pairs of shoe members engage the corresponding intermediate roller 21 on opposite sides thereof as shown in FIG. 3. Opposing end faces 28 are convergently inclined toward each other in a radially outward direction so that movement of the intermediate roller 21 outwardly in a radial direction tends to force the shoe members outwardly. This operates to force the outer cylindrical surfaces of the shoes 20 thereof into an engagement with the cylindrical surface 22 of the outer member 18 while the other portions of the rollers 21 are engaged by the adjacent shoe members 20. The inner portion of each roller projects inwardly toward the corresponding side of the inner member 19.

The inner member 19 has a plurality of concave surfaces 29 on each of the four sides of the inner member 19 which engage with the corresponding roller 21. The concave cam surfaces 29 extend vertically the length of the rollers 21 and is formed about an axis parallel with the corresponding roller and interest with the corresponding flat side face of the inner member 19 so as to leave a substantial collar portion on this inner member at each corner thereof. To facilitate manufacture the inner member is made by milling out the concave cam surfaces 29. When handle 15 is moved in a counterclockwise direction and the spring wire is in the position shown, the cam surfaces 29 will move outwardly when in turn tends to spread the shoe members 20 thereby forcing the same into some frictional engagement with the outer member 18. Thereby an inner and an outer member are locked together. However when the handle 15 is moved in a clockwise direction the rollers 21 will tend to move toward the center of the concave cam faces 29 and this will relieve the pressure in the shoe members 20 and the outer members 18 and permit slippage therebetween. The collar 44 has two spaced diametrically opposed notches 52. One notch 52 receives the ends 33 of the reversing spring 34. The ends 33 extend outward between the ends 130 of two adjacent shoe members and thence outward into notch 52. Therefore when collar 44 is rotated, the shoes 20 are rotated, through a like angle relative to inner member 19. Thus by rotating collar 44 relative to inner member 19, the point of contact of rollers 21 with the ends 52 of the shoes can be regulated as shown in FIG. 3. If more force is applied to the handle when the roller 21 reaches the end of the concave cam surfaces 29, the roller 21 will ride up on the edges of the flat surface of the member 19 that are adjacent the concave cam surfaces 29. In order to reverse the cam and make the ratchet work in the opposite direction the collar 44 will be rotated clockwise on outer member 18 a distance of about 10° which will move detent 50 from hole 146 to hole 147. This will move the ends 33 of the spring wire relative to the collar 44. This will hold the rollers 21 in proximity to the most clockwise side of the concave surface and therefore cause the wrench to ratchet in the opposite direction. Holding the collar 44 in one of two predetermined positions to cause the ratchet to drive in one direction and reverse.

In FIGS. 5 and 6 is shown another embodiment of the reversing mechanism and a flat circular member 134 which has two diametrically spaced outwardly extending end portions 135 whose ends 135 are adapted to rest in the notches 52 in collar 44. The notches 52 can be formed in the collar 44 and operation there will be registered over the top of the bases between two opposite shoe members. The ends 33 of the wire spread outwardly between the ends of the shoe member and engage the ends thereof and also engage the sides of one notch 52. The function of member 134 is identical with the function of member 34.

In FIG. 8 is shown another embodiment of the invention which discloses a brake assembly for automobiles. The brake is made up of the housing support 200 that has the bores 201 and has four spaced brake shoe members 204 connected thereto by lugs 206. The bores 201 are formed in the housing support 200 and springs 301 are attached to the housing support 200 at one end by pins 202 in bores 201 and to pins 203 attached to the brake shoes 204 at the other end thereof.

Housing 200 will have lugs 206 connected thereto at space places which will be received in slots 207 in each brake shoe so that the brake shoes can be held in position against rotative movement on the housing and guided outwardly and inwardly.

The opposing ends 228 of each brake shoe will be of angles having magnitude similar to the ends of the shoes in the embodiment of the invention shown in FIGS. 1–3.

The housing 200 has spaced cylindrical bores 230 that receives pistons 241 therein and the bores communicate with the liquid passage 243 that may be filled with hydraulic fluid and connected to a pressure actuated hydraulic source. In engagement with the cylinders 241 are the roller members 221 that are adapted to be forced outwardly by the pistons 241 when the pistons are acted on by the fluid in the cylindrical bores 250 which communicate with the passage 243.

The periphery of the brake shoes may have a lining 260 attached thereto which is adapted to engage the inside 261 of a brake drum.

During operation when it is desired to lock the brake shoe members 204 having a lining 260 thereon with the drum the operator will apply a force to the fluid in passage 243 which will force the pistons 241 outward driving the roller members 221 outward and forcing the shoes 204 to spread due to the force on the ends 228 thereof and so force the shoes outward into frictional engagement with the inside of the drum.

Therefore when the shoe angle or the angle that the end of the shoe makes with a radial line through the center of the drum and the camming angle or angle the tangent to the cam surface curve makes with a line perpendicular to a radius through the center of the cam roller have the relationship the clutch wrench cannot slip. The relationship of the angles can vary slightly from the above and still the clutch will have a fairly large resistance to slipping however in order to have a clutch that will positively lock in one direction under all circumstances and have optimism operational relationship of parts, the relation of angles must be as set out above.

These angles could conceivably be decreased until the above ratio is much less than the $u$, but if they are decreased substantially the rollers will wedge between the shoe ends and stick there and if the cam angles are too flat, they will not give the rollers a sufficient movement.

In the foregoing specifications, we have set forth the invention in its preferred practical forms but we are aware that the structure shown is capable of modification within a range of equivalents without departing from the invention which is to be understood is broadly novel as is commensurate with the appended claims.

The embodiments of the invention in which an exclusive property or privilege is claimed are defined as follows:

1. A friction clutch comprising an inner member, an outer member having a cylindrical surface surrounding said inner member and spaced therefrom, at least four shoe members arranged at circumferential intervals in the space between said inner and outer members, an arcuate outer face on each said shoe member and adapted to frictionally engage said cylindrical surface, the radius of curvature of said arcuate outer face being slightly greater than the radius of curvature of said cylindrical surface, the opposing end faces of adjacent shoe members being convergently inclined toward each other in a radial outward direction at an angle with the periphery of the shoe member, a curved cam face having a center of curvature on said inner members for each pair of said convergently inclined end faces of said shoe members, and a wedge member engaging each said opposing end faces of said adjacent shoe member, said end face being disposed at an angle to a line perpendicular to a radial line through the center of curvature of said curved cam face at an angle $d$ and said end faces being disposed at an angle B to said radial line a portion of the surfaces of said shoes engaging a portion of said inner cylindrical surface and having a resistance to slipping thereon when a force is applied thereto the ratio of said applied force and said resistance to slipping being designated by $u$, said angles having the relation $$\left(\frac{1-\tan d}{1+\tan d}\right)\tan d \tan B \leq u$$

2. A clutch comprising an outside member having an axial bore and a first counterbore formed therein, said first counterbore terminating in a closed end with said bore therein, an inner member disposed in said counterbore having a reduced size end extending into said axial bore, a plurality of spaced, axially extending concave camming surfaces thereon, a handle engaging member attached to said inner member and extending outwardly therefrom, a collar disposed around said outwardly extending portion, a second counterbore in said outside member, said collar being rotatably disposed in said second counterbore in said outside member, said second counterbore being concentric with said first mentioned counterbore, means on said collar to hold said inner member in said first counterbore, a plurality of spaced shoes having inwardly diverging ends and having outer surfaces generally conforming to the inner peripheral surface of said first counterbore, cam members disposed between said concave surfaces and said diverging ends, and a circular member extending around said inner member inside said shoes and having an outwardly turned end extending between the ends of two adjacent shoes and means on said collar to hold said circular member ends thereto, whereby when said collar is rotated, said shoe members are urged toward the side of said concave surfaces toward which said collar was rotated.

3. The clutch recited in claim 2 wherein said circular member comprises a wire bent in circular form and having both ends forming said outwardly extending end.

4. The clutch recited in claim 2 wherein said means to hold said inner member in said counterbore comprises a circumferential peripheral groove in said collar and an internal peripheral groove in said counterbore said peripheral grooves being adapted to register with each other and a spring washer adapted to rest part in one said groove and part in another.

5. The clutch recited in claim 2 wherein a spring loaded ball detent is disposed in said inner member and adapted to be urged into a hole in said collar to hold said circular member ends in a first position whereby said shoes grip said inside surface when said inner member is rotated in one direction and said ball adapted to engage a said ball to hold said collar in a second position holding said circular member ends in said shoes in a second position relative to said concave surfaces whereby said inner member is driven in a second direction.

References Cited in the file of this patent
UNITED STATES PATENTS

| | | |
|---|---|---|
| 1,136,821 | Loomis | Apr. 20, 1915 |
| 1,940,469 | Taylor | Dec. 19, 1933 |
| 2,389,405 | Birchfield | Nov. 20, 1945 |
| 2,410,392 | Rich | Oct. 29, 1946 |
| 2,584,256 | Brown | Feb. 5, 1952 |
| 2,707,540 | Morris | May 3, 1955 |